US007226658B2

(12) United States Patent
Sashi et al.

(10) Patent No.: US 7,226,658 B2
(45) Date of Patent: Jun. 5, 2007

(54) ELECTRICAL SHEET HAVING INSULATING COATING AND INSULATING COATING

(75) Inventors: Kazumichi Sashi, Kurashiki (JP); Yuka Komori, Kurashiki (JP); Masaki Kawano, Kurashiki (JP); Atsuhito Honda, Kurashiki (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/297,656

(22) PCT Filed: Apr. 10, 2002

(86) PCT No.: PCT/JP02/03571

§ 371 (c)(1),
(2), (4) Date: Dec. 9, 2002

(87) PCT Pub. No.: WO02/083982

PCT Pub. Date: Oct. 24, 2002

(65) Prior Publication Data

US 2003/0175524 A1 Sep. 18, 2003

(30) Foreign Application Priority Data

Apr. 12, 2001 (JP) ............................ 2001-113575

(51) Int. Cl.
*B32B 5/14* (2006.01)
*B32B 15/08* (2006.01)
*B32B 15/18* (2006.01)
*B32B 27/18* (2006.01)

(52) U.S. Cl. ...................... 428/336; 428/413; 428/419; 428/421; 428/422; 428/457; 428/473.5; 428/474.4; 428/522; 428/900

(58) Field of Classification Search ................ 428/413, 428/419, 411.1, 422, 457, 473.5, 474.4, 522, 428/900, 336, 421; 524/417, 430, 544, 545, 524/546
See application file for complete search history.

(56) References Cited

U.S. PATENT DOCUMENTS

| | | | | |
|---|---|---|---|---|
| 4,014,717 | A * | 3/1977 | Barisoni et al. | 148/111 |
| 4,090,993 | A * | 5/1978 | Attwood et al. | 524/508 |
| 4,104,225 | A * | 8/1978 | Conbere | 524/417 |
| 4,127,429 | A * | 11/1978 | Ichida et al. | 148/113 |
| 4,140,645 | A * | 2/1979 | Beall et al. | 501/4 |
| 4,701,345 | A * | 10/1987 | Giatras et al. | 427/521 |
| 4,800,661 | A * | 1/1989 | Yamamoto et al. | 38/93 |
| 5,102,478 | A * | 4/1992 | Hosoya et al. | 148/111 |
| 5,573,846 | A * | 11/1996 | Harig et al. | 428/323 |
| 6,191,510 | B1 * | 2/2001 | Landin et al. | 310/51 |
| 6,232,372 | B1 * | 5/2001 | Brothers et al. | 523/206 |
| 6,291,054 | B1 * | 9/2001 | Thomas et al. | 428/141 |
| 6,740,375 | B1 * | 5/2004 | Sagisaka et al. | 428/35.7 |

FOREIGN PATENT DOCUMENTS

| | | |
|---|---|---|
| JP | 63193965 A * | 8/1988 |
| WO | WO 00/11093 | 2/2000 |
| WO | WO 200118142 A1 * | 3/2001 |

OTHER PUBLICATIONS

MatWeb Online Material Data Sheet, Allegheny Ludlum Moly Permalloy Electrical Alloy, Apr. 2005.*
Derwent abstract of JP 63-193965, Aug. 1988.*
English translation of WO 01-18142, Mar. 2001.*

* cited by examiner

*Primary Examiner*—Ramsey Zacharia
(74) *Attorney, Agent, or Firm*—DLA Piper US LLP

(57) ABSTRACT

A magnetic steel sheet with an insulating coating having a good punchability, high sliding performance, excellent handleability in processing, and good uniformity and adhesiveness is achieved by forming a chromium-free insulating coating containing 20 parts by mass or more and 90 parts by mass or less of fluorocarbon resin as a top layer coating of the magnetic steel sheet, and preferably making the kinetic friction coefficient of a surface of the insulating coating 0.3 or less.

22 Claims, 1 Drawing Sheet

FIGURE
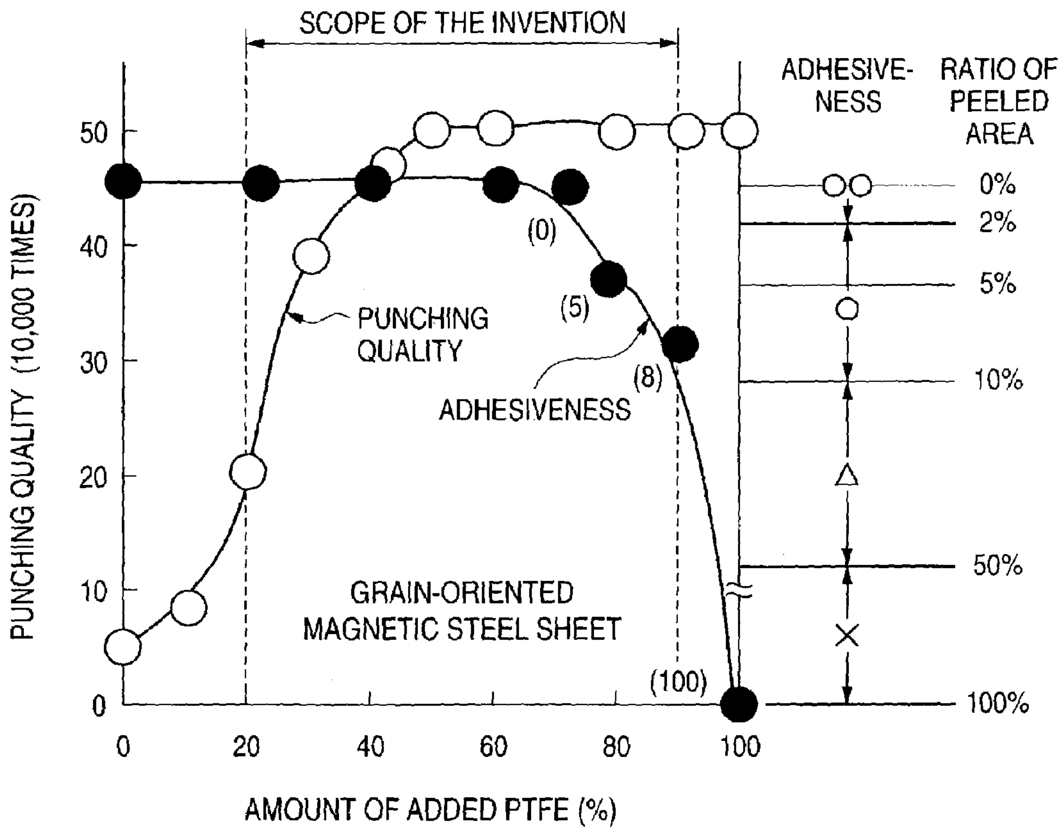

ELECTRICAL SHEET HAVING INSULATING COATING AND INSULATING COATING

TECHNICAL FIELD

This disclosure relates to a magnetic steel sheet having an insulating coating. Although the magnetic steel sheet having the insulating coating is often subjected to processing, mainly slitting, punching, and so on, for use in making laminated cores, the invention is not intended to be limited to such application.

The disclosure, in particular, intends to achieve a magnetic steel sheet with the insulating coating, which has a high punchability, good sliding performance among steel sheets, high adhesiveness, anti-adherability of water drops and dirt as a cause of rust, and high corrosion resistance.

Further, the disclosure relates to a chromium-free coating suitable for use in the top layer of the above insulating coating of the magnetic steel sheet.

BACKGROUND

While the insulating coating of the magnetic steel sheet for use in motors and transformers and the like is required to have a certain interlayer resistance, not limited to that, but various other properties are required in view of convenience in processing and storage. Since application of the magnetic steel sheet is versatile, various types of insulating coating have been developed depending on the application.

The insulating coating can be classified broadly into three types: (1) an inorganic coating sustainable for stress relief annealing, in greater accounts of weldability and heat resistance, (2) a semi-organic coating which consists of inorganic with some organic materials, sustainable for the stress relief annealing, with the aim of combining the punching quality and weldability, and (3) a special-purpose organic coating unsustainable for the stress relief annealing. Regarding the punching quality (that is, a capability of reducing abrasion of the punching die), typically, a tendency of (3), (2), (1) in order is regarded according to better quality.

Recently, with improvement of performance of motors and transformers, performance of the magnetic steel sheet tends to improve accordingly. Since a magnetic steel sheet having excellent magnetic properties has an increased content of Si and the like, there has been a problem that the punching quality becomes bad because of increased hardness of the steel sheet.

A magnetic steel sheet having a low hardness is also required to have a more excellent punching quality to achieve cost reduction by decreasing number of times of die-grinding.

As the semi-organic coating in the above (2), a coating having chromate as a matrix of the coating and resin, such as acrylic resin, epoxy resin, polyvinylacetate, and the like, added to the matrix is mainly used because of comparatively good material characteristics (insulation performance, adhesiveness of coating, corrosion resistance, and the like). Then, as a method for improving the punching quality of the semi-organic coating, use of fluorocarbon-based resin as the resin added to the chromate is proposed.

For example, Japanese Patent Publication No. 4-43715/1992 discloses a method for forming the insulating coating, in which a fluorocarbon resin or polyethylene is dispersed in the chromate (solution), and then the fluorocarbon resin is baked to be concentrated on the surface. In addition, Japanese Patent Publication No. 7-35584/1995discloses a method for forming the insulating coating, in which a treatment liquid, where a phenolic resin, perfluoroalkyloxyethyleneethanol, and the like are dispersed in the chromate, is coated and then baked. Further, Japanese Patent Laid-Open No. 7-278834/1995, Japanese Patent Laid-Open No. 7-286283/1995, and Japanese Patent Laid-Open No. 7-331453/1995 also disclose the magnetic steel sheet in which the fluorocarbon-based resin is present as the outer or inner layer of the resin particles in the inorganic coating consisting of chromate.

Although these methods improve the punching quality of the magnetic steel sheet, the improvement was not sufficient for the magnetic steel sheet having a high hardness. Even when these methods are used for the magnetic steel sheet having a low hardness, still higher punching quality has been also required.

In addition, in these methods, the fluorocarbon resin was unstable and thus uniform and well-adhesive coating was not obtained.

On the other hand, in case the organic coating like (3) was coated, the improvement of the punching quality was also inadequate.

The punched, magnetic steel sheets are stacked and used for cores. In such stacking, the steel sheets must be slid among them to align edges of the stacked steel sheets, however, a poor sliding performance prevents the processing. On the contrary, it is known that the sliding performance is improved by making the surface of the steel sheets dull-like (pear-surface-like) or giving an insulating coating having a rough surface so that air easily enters the space between the steel sheets to reduce sticking of the steel sheets.

On the other hand, with improvement of the performance of the magnetic steel sheet, the thickness of the sheets tends to reduce and number of sheets stacked increases accordingly, thus the sliding performance of the steel sheets is important in the stacking. In this case, for the traditional dull steel sheets, performance of the magnetic steel sheet becomes bad in view of its magnetic properties, and for the steel sheets with the insulating coating having a roughed surface-roughness, there has been a problem that while the stick among the steel sheets reduces, dust is liable to generate.

SUMMARY

We provide a magnetic steel sheet with an insulating coating, which has an improved punching quality, high sliding performance, excellent handleability in processing, and a high uniformity and adhesiveness. In particular, regarding the punching quality, whether the coating is used for a steel sheet material with a low hardness, or with a high hardness, the punching quality is significantly improved.

We provide a magnetic steel sheet with an insulating coating, having an excellent processability, sliding performance, and adhesiveness, characterized by chromium-free or containing no chromium (substantially 1.0% by weight or less) and containing 20 percent by mass or more and 90 percent by mass or less of the fluorocarbon resin. In addition, the insulating coating, which is suitable for the top layer of the insulating coating on the magnetic steel sheet, is a chromium-free insulating coating characterized by containing no chromium and containing 20 percent by mass or more and 90 percent by mass or less of the fluorocarbon resin.

The kinetic friction coefficient of the surface of the insulating coating is preferably 0.3 or less.

Preferably, the fluorocarbon resin is at least one selected from the group consisting of polytetrafluoroethylene (PTFE), tetrafluoroethylene-perfluoroalkylvinylether copolymers (PFA), and tetrafluoroethylene-hexafluoropropylene copolymers (FEP).

BRIEF DESCRIPTION OF THE DRAWINGS

FIG. 1 is a graph showing evaluation results of the punching quality and adhesiveness of the magnetic steel sheets after being punched.

DETAILED DESCRIPTION

A magnetic steel sheet (electrical iron sheet) is used as a starting material. A known magnetic steel sheet can be used, which may be unidirectionally grain-oriented, or non-oriented, or bidirectionally grain-oriented. The unidirectionally grain-oriented, magnetic steel sheet may or may not have a forsterite coating and/or phosphate-based coating, thereon.

Although it is preferable to give the top layer coating containing the fluorocarbon resin as described later directly on these materials, it is not intended to inhibit to locate a further different coating layer (preferably insulating coating) between the top layer and said materials. As such coating layer, for example, the phosphate-based coating and chromate-based coating are preferable, which may or may not contain the resin.

The chemical composition of the magnetic steel sheet is not particularly limited. The grain-oriented (unidirectionally or bidirectionally), magnetic steel sheet includes, for example, a steel sheet having 2 to 4% by mass of Si, 0.4% by mass or less of Mn, and 0.1% by mass or less of Al, which contains totally 0.5% by mass or less of one or two or more of inhibitor elements (Mn, Se, S, Al, N, Bi, B, Sb, Sn, and the like) as required (individual content of Mn and Al is according to the above). The non-oriented, magnetic steel sheet includes, for example, a steel sheet having 4% by mass or less of Si (preferably, 0.05% by mass or more), 1.0% by mass or less of Mn, 3.0% by mass or less of Al, 0.01% by mass or less of C, 0.5% by mass or less of P, 0.1% by mass or less of S, and 0.1% by mass or less of Ti, and having totally 0.5% by mass or less of one or two or more of Zr, V, Nb, Ca, Sb, Sn, and Cu as required. In each steel sheet, the rest is iron and incidental impurities.

In particular, when Si is 2.5% by mass or more, the magnetic steel sheet exhibits high hardness, and when Si is less than 2.5% by mass, the magnetic steel sheet exhibits low hardness.

The thickness of the magnetic steel sheet is not particularly limited. A typical thickness, about 0.05 to 1.0 mm is preferable.

On the top layer of the magnetic steel sheet of the invention, the chromium-free insulating coating containing the fluorocarbon resin (hereinafter referred as top layer coating) must be formed. The fluorocarbon resin includes a polytetrafluoroethylene (PTFE) resin, a tetrafluoroetylene-perfluoroalkylvinylether copolymer (PFA), a tetrafluoroethylene-hexafluoropropylene copolymer (FEP), a trifluoroethylene resin, a fluorovinylidene resin, a fluorovinyl resin, a tetrafluoroethylene-ethylene copolymer, and copolymers of these polymers and a ethylene resin. Among them, one or two or more of PTFE, PFA, and FEP, which have a low friction coefficient and excellent non-stick, can be preferably contained.

On the inner layer, the above forsterite coating or phosphate-based coating may be present, or only the coating containing the above fluorocarbon resin may be present. Typically, these inner layers are also insulative, forming the insulating coating together with the top layer.

The forsterite coating is formed by coating an annealing separator having MgO as a base on the surface and reacting it with base iron in finishing annealing, and its preferable composition is a composition that forsterite ($Mg_2SiO_4$) is a main component (50% by mass or more for the entire layer of interest), and the rest contains iron oxide and subsidiary impurities. In addition, the preferable composition of the phosphate-based coating is a composition that the phosphate, such as magnesium phosphate, aluminum phosphate, and calcium phosphate, is the main component (preferably containing 50% by mass or more), and the rest further contains any additive such as chromic acid, chromate, silica, and boric acid as required.

While the form of the fluorocarbon resin before forming the coating is not particularly limited, the resin may be used in liquid solution state dissolved in organic solvent (preferably pyrolidone-based solvent), dispersed state (dispersion) or emulsified state (emulsion) with nonionic surfactants and the like, fine powder state, and molding powder state, etc. In consideration of dispersibility, it is preferably used in the liquid solution state, dispersion state, or emulsion state.

We improve the sliding performance of the coating surface by using a phenomenon that the fluorocarbon resin concentrates on the surface from the coating step of the insulation coating to the baking step. Therefore, the fluorocarbon resin content in the top layer coating must be 20 parts by mass or more and 90 parts by mass or less for 100 parts by mass of the top-layer insulating coating, that is, from 20 to 90% by mass for the entire top-layer coating on average. Here, the reason why the average value is employed is that the fluorocarbon resin may concentrate on the surface as described before. Below 20 percent by mass, the effect for improvement of the punching quality to be expected by the invention can not be achieved, on the other hand, over 90 percent by mass, the adhesiveness of the coating becomes poor. The preferable content of the fluorocarbon resin is from 30 to 80 percent by mass. This aspect is obvious in FIG. 1 showing a variation of the punching quality and coating adhesiveness against the fluorocarbon resin content in the grain-oriented, magnetic steel sheet.

In FIG. 1, a grain-oriented, magnetic steel sheet (in which Si is 3.3%, Mn is 0.07%, and Al is less than 0.001%, and Sb, Sn, and the like, which will remain in product sheets among the inhibitors except the above, are 0.5% or less in total, in mass %, and the rest is iron and impurities) was used as the magnetic steel sheet, on which the forsterite coating as the bottom layer was formed, the phosphate-based coating was formed thereon, and the insulating coating comprising the fluorocarbon resin (PTFE) and organic resin (PES) as the top layer was formed still thereon.

Other components than the fluorocarbon resin in the top surface coating of the magnetic steel sheet are preferably organic resin and/or inorganic compounds, of which content in the top layer coating is 10 to 80 percent by mass, and preferably 20 to 70 percent by mass.

As the organic resin other than the fluorocarbon resin, one or a mixture of two or more of an epoxy resin, an acrylic resin, a vinylacetate resin, a phenilic resin, a polyethersulfone resin (PES), a polyphenylenesulfide resin (PPS), a polysulfone resin, a polyallylsulfone resin, a polyetheretherketone resin (PEEK), a polyetherimide resin, a polyamide-imide resin, and the like can be used. By adding such organic resin, the organic resin effectively acts as the matrix to stabilize the coating. Among them, PES, PEEK, PPS, the polysulfone resin and the like are heat-resistant thermoplastic resin, so that they are useful in baking at high temperature to concentrate the fluorocarbon resin having a high melting point such as PTFE, PFA, FEP, on the top layer. This provides the effect for improvement of the adhesiveness to the substrate (surface of the under layer coating or steel sheet), which is further preferable. Particularly, a combination of PTFE and PES, or PTFE and PPS is preferable.

The inorganic compounds include phosphates such as magnesium phosphate, aluminum phosphate, and calcium phosphate; inorganic oxides of elements of the group 3 or 4 in the periodic table such as alumina and silica; and metal compounds of elements of the group 3 in the periodic table such as aluminum compounds. The phosphate, in particular, such as magnesium phosphate or aluminum phosphate is preferable. One or a mixture of two or more of these may be used.

Since the above top layer coating is chromium-free, chromium and chromium compounds are not contained (although chromium is scarcely present as an elemental substance after formation of the coating because it has a high reactivity). Therefore, the chromium compounds are excepted from said inorganic compounds. The chromium compounds are well adapted to the steel sheets and frequently used as the insulating coating material of the magnetic steel sheets. However, according to our studies, since the chromium compounds are highly oxidative, it cannot disperse the fluorocarbon resin stably, so that the fluorocarbon resin will cause agglomeration/separation. In addition, to disperse the fluorocarbon resin, modification of the fluorocarbon resin (introduction of a hydrophilic group such as a hydroxyl group, ethylene oxide, carboxylic acid, amine, and the like using the methods such as co-polymerization and graft-polymerization) or excessive emulsification/dispersing is required, resulting that the functions of the fluorocarbon resin deteriorate and the original performance is damaged. Therefore, the formed coating is uneven, poor in adhesiveness, and inadequate in the effect for improvement of punching quality and sliding performance. Accordingly, the insulating coating of the invention must not contain chromium and chromium compounds.

The thickness of the insulating coating containing the fluorocarbon resin, or the thickness of the top layer is not particularly limited, however, when the coating mass is too small, the coating tends to be uneven and the surface of the under layer coating or steel sheet tends to be exposed. Thus, the advantage is possibly inadequate. When the coating mass is too large, coating workability may deteriorate, for example, blisters may occur in the baking. The preferable average thickness of the insulating coating of the top layer containing the fluorocarbon resin is 0.01 to 20 μm, and more preferably 0.1 to 5.0 μm.

When an inner layer is included, the average thickness of the inner layer is preferably about 0.1 to 20 μm. The average thickness was obtained by taking an enlarged photograph of the cross section of the coating given from a mold-polishing or freeze-fracturing, measuring the thickness of the target coating at ten points, and taking the arithmetic average of them. It is also acceptable to measure the decrease in the weight per unit area (coating amount) in case the target coating is released with solvent or alkaline solution, take a correlation of the decrease of the weight with the above average thickness, and calculate the average thickness from the coating amount using the correlation line (calibration line).

The coating may be effectively located either on both sides or on only one side. When the coating of the invention is located on both sides, one side need not have the same coating thereon as that on the other side. When it is located only on one side, any coating other than ours can be freely located on the other side.

To keep the sliding performance and formability of the insulating coating good, the kinetic friction coefficient of the insulating coating containing the fluorocarbon resin of the invention is preferably 0.3 or less, more preferably 0.25 or less, and still more preferably 0.2 or less.

To hold the kinetic friction coefficient among the insulating coatings containing the fluorocarbon resin within a predetermined low value, it is preferable to concentrate the fluorocarbon resin on the surface by heat treatment. For example, when the top layer coating of the invention is given in the steps from application to baking, the baking temperature is preferably equal to the melting point (for example, 327° C. in PTFE), or glass transition temperature of the fluorocarbon resin or more. However, since it is desirable to determine the maximum of the baking temperature not to decompose the fluorocarbon resin and matrix (the organic resin and/or inorganic compounds other than fluorocarbon resin), when the decomposition temperature of the matrix is lower than the melting point or glass transition temperature of the fluorocarbon resin, it is preferable to perform the baking at a temperature as close to the decomposition temperature of the matrix as possible.

More preferably, the baking temperature is equal to the melting point (for example, 277° C. for PPS) or glass transition temperature (for example, 225° C. for PES) of the matrix or more. That is, for example, in the case of a composition containing PTFE and one or two of PES and PPS, the baking condition is preferably on the order of 330 to 480° C. for 10 seconds to 2 hours. The maximum of the baking temperature, 480° C., was set to be close (just under side) to the minimum decomposition temperature of the above resin constituting the coating. A more preferable baking condition is on the order of 350 to 470° C. for 20 seconds to 1 hour, from which a value of 0.1 of the kinetic friction coefficient can be achieved when the composition is in a preferable range.

Next, a formation method of the coating for achieving the magnetic steel sheet is described.

To improve the adhesiveness of the insulating coating containing the fluorocarbon resin to the magnetic steel sheet, it is preferable to perform a pretreatment such as primer coating on the magnetic steel sheet. In the primer, components other than the fluorocarbon resin in the top layer coating are preferably used as the main component. For example, when PTFE and PES are used for the top layer coating, PES is preferably used. Also, when PTFE and PPS are used for the top layer coating, PPS is preferably used.

The coating solution containing the above agents, namely the fluorocarbon resin and organic resin and/or inorganic compounds are applied and baked to the magnetic steel sheets to form the coating. The ratio of the fluorocarbon resin and other solid contents in the formed coating is substantially equal to the ratio of them in the solid contents in the coating solution. The form of the coating solution, which is not limited particularly, may be either of solvent type, aqueous solution type, dispersion type, emulsion type, and slurry type. By adjusting the fluorocarbon resin content in the solid content of the coating solution, the insulating coating containing the fluorocarbon resin in a desired amount can be formed.

In the formation of the insulating coating, as the applying method of the coating solution, various methods including roll-coater method, flow-coater method, spray-coating, knife-coater method, and the like are usable, these methods being generally used industrially. Also, for the baking methods, hot-air type, infra-red type, induction heating type, radiant-tube type, direct-fire type, and the like as typically practiced are usable. The preferable baking temperature is 150 to 500° C.

To further improve the performance of the coating, additives such as anti-corrosive agents and pigments (added for coloring and/or enhancement of insulation performance) may be blended into the coating solution. The total amount of the additives is preferably 300 parts by mass or less for 100 parts by mass of the top layer insulating coating (without additives). Particularly, 3 parts by weight or more of additives are effectively added.

Also, when the inner-layer coating is formed, it is preferable, as the case of the top layer, to apply the coating solution using the typical industrial methods, including the roll-coater method, flow-coater method, spray-coating, and knife-coater method, and then bake the coated solution by the methods including the hot-air type, infra-red type, induction heating type, radiant-tube type, and direct-fire type oven. However, regarding the forsterite layer, it is typically formed by applying the annealing separator having MgO as the main component on the surface before the finishing annealing and then performing the finishing annealing in manufacturing of the magnetic steel sheet.

While the magnetic steel sheet is usable for any type of punching application because it is a magnetic steel sheet with the insulating coating having a high punching quality and sliding performance, and a high adhesiveness, in particular, it is preferably usable for stators of motors, rotors, El cores of transformers, magnetic shield materials, and the like.

EXAMPLES

Hereinafter, advantages of the steel sheets are specifically described according to examples.

Examples: 1–69, Comparative Examples: 1–36

The coating solution containing the components listed in Table 1 was coated on a unidirectional (grain-oriented) magnetic steel sheet comprising 3.3% by mass of Si, 0.07% by mass of Mn, less than 0.001% by mass of Al, and the rest of Fe and impurities; a grain-oriented, magnetic steel sheet comprising 3.0% by mass of Si, 0.2% by mass of Mn, less than 0.001% by mass of Al, and the rest of Fe and impurities; a non-oriented magnetic steel sheet comprising 3.0% by mass of Si, 0.2% by mass of Mn, 0.2% by mass of Al, and the rest of Fe and impurities; and a non-oriented magnetic steel sheet comprising 0.25% by mass of Si, 0.25% by mass of Mn, 0.25% by mass of Al, and the rest of Fe and impurities, each steel sheet having a thickness of 0.35 mm, to form a top layer insulating coating having a thickness of 2 μm. A coating of a forsterite coating (lower layer, 4 μm in thickness) and phosphate-based coating (upper layer, 3 μm in thickness), a coating of only a forsterite coating (4 μm in thickness), a coating of only a phosphate-based coating (1 μm in thickness), and a coating of a chromate-based coating (0.3 μm in thickness), were prepared respectively as the under coating. Regarding the surface roughness of the steel sheets, the steel sheet having an average roughness Ra of 0.5 μm or less was used.

The solution for the top layer coating was an organic solvent type, and a pyrolidone-based solvent was used as the solvent. The roll-coater was used to apply the solution, and the applied solution was baked at a sheet temperature of 400° C. and cooled in the atmosphere, then provided for following the evaluation.

The forsterite was formed by applying the annealing separator (composition: 95% by mass of MgO and 5% by mass of $TiO_2$) with water slurry, drying it, and then performing the finishing annealing (after temperature up under atmosphere of 75% by volume of $H_2$-$N_2$ in the condition of 10° C./hr from 800 to 1100° C., soaking at 1200° C. for 10 hr wherein the atmosphere at 1100° C. or more was 100% of $H_2$). In addition, the phosphate-based coating coated on the forsterite layer in the grain-oriented magnetic steel sheet was formed by coating a solution (a water-based solution for magnesium phosphate, chromic acid, silica, and the like) with the roll-coater and baking it at 800° C. Further, a monolayer under coating in the non-oriented magnetic steel sheet and the like was formed by coating a water-based solution for aluminum phosphate, chromic acid, boric acid, and the like with the roll-coater and baking it at 300° C.

The chromium content contained in the top layer coating of the invention was 0.0% by weight or less.

Evaluation of Punching Quality

Continuous punching was done with a 15-mm-diameter steel die (made of SKD-11) using the punching oil in the clearance setting of 5 to 8% of sheet thickness. Number of punching times until burr height reached 50 μm was counted and evaluated. The burr height was measured at four points per punched material to take a maximum value, and the average value of respective maximum burr heights of three pieces of punched materials was used. The punching rate was set 450 strokes/min.

Methods for Measuring Kinetic Friction Coefficient

The kinetic friction coefficient among the treated steel sheets was measured in conformity with ASTM (American Society for Testing and Materials)-D1894.

The measurement of the kinetic friction coefficient was done using the Peeling/Slipping/Scratching TESTER HEIDON (R) -14 by SINTOKAGAKU KK (kabushiki kaisha) For the test pieces, the upper test piece was a square 30 mm on a side and the lower test piece was a 50×100-mm-rectangle. The kinetic friction coefficient was measured by pressing the upper test piece on the lower test piece under load of 200 g and sliding the upper test piece at a rate of 150 mm/min. Burr was wholly removed from the sheared portion on the measured surface side so that the burr didn't contact other sheet.

Evaluation of Sliding Performance

The EI core was stacked with a hand-cranked stacking machine, and the resistance at that time was evaluated according to a following criterion. As the stacking machine, an automatic core stacking machine AK-HEI-41 by AOKIJIDOKI KK was used.

OO: very light

O: light

Δ: moderate x: heavy

Evaluation of Adhesiveness

An inward bending was practiced (by hand bending) with a round bar 20 mm diameter for the grain-oriented magnetic steel sheet, and a round bar 10 mm diameter for the non-oriented magnetic steel sheet. After that Scotch tape was attached on the surface of the steel sheet coating, then the peeling amount of the coating (including lifted portion) was visually determined when the tape was removed, and evaluated according to a following criterion.

OO: no peeling (area ratio of the peeled portion: substantially 0% (about 0 to 2%).)

O: slight peeling (area ratio of the peeled portion: 10% or less.)

Δ: peeling (area ratio of the peeled portion: more than 10% and 50% or less.)

x: great peeling (area ratio of the peeled portion: more than 50%.)

Evaluation of the Corrosion Resistance

The steel sheets were subjected to a constant temperature and humidity test (50° C., 98% relative humidity), the red ruster incidence (incidence area) after two days was observed visually and evaluated according to a following criterion.

OO: less than 20%

O: 20% or more and less than 40%

Δ: 40% or more and less than 60% x: 60% or more

As shown clearly from Table 1, each of the examples of the invention exhibits a large advantage for improvement of the punching quality and sliding performance, and an excellent adhesiveness and corrosion resistance.

TABLE 1-1

| | steel sheet | Si content % | under coating | fluorocarbon resin in top layer | fluorocarbon resin content % | the rest of top layer | baking temperature (PMT) ° C. | kinetic friction coefficient | punchability 10,000 times | sliding performance | adhesiveness | corrosion resistance |
|---|---|---|---|---|---|---|---|---|---|---|---|---|
| comparative example 1 | grain-oriented | 3.0 | forsterile (lower) + magnesium phosphate-based coating | no | no | no | no | 0.5 | 5 | Δ | — | X |
| comparative example 2 | grain-oriented | 3.0 | forsterile (lower) + magnesium phosphate-based coating | no | no | PES | 400 | 0.4 | 7 | Δ | ○○ | ○○ |
| comparative example 3 | grain-oriented | 3.0 | forsterile (lower) + magnesium phosphate-based coating | PTFE | 10 | PES | 400 | 0.4 | 10 | Δ | ○○ | ○○ |
| practical example 1 | grain-oriented | 3.0 | forsterile (lower) + magnesium phosphate-based coating | PTFE | 20 | PES | 400 | 0.3 | 20 | ○ | ○○ | ○○ |
| practical example 2 | grain-oriented | 3.0 | forsterile (mower) + magnesium phosphate-based coating | PTFE | 30 | PES | 400 | 0.2 | 40 | ○○ | ○○ | ○○ |
| practical example 3 | grain-oriented | 3.0 | forsterile (lower) + magnesium phosphate-based cotaing | PTFE | 40 | PES | 400 | 0.1 | 45 | ○○ | ○○ | ○○ |
| practical example 4 | grain-oriented | 3.0 | forsterile (lower) + magnesium phosphate-based coating | PTFE | 50 | PES | 400 | 0.1 | 50 | ○○ | ○○ | ○○ |
| practical example 5 | grain-oriented | 3.0 | forsterile (lower) + magnesium phosphate-based coating | PTFE | 60 | PES | 400 | 0.1 | 50 | ○○ | ○○ | ○○ |
| practical example 6 | grain-oriented | 3.0 | forsterile (lower) + magnesium phosphate-based coating | PTFE | 70 | PES | 400 | 0.1 | 50 | ○○ | ○○ | ○○ |
| practical example 7 | grain-oriented | 3.0 | forsterile (lower) + magnesium phosphate-based coating | PTFE | 80 | PES | 400 | 0.1 | 50 | ○○ | ○ | ○ |
| practical example 8 | grain-oriented | 3.0 | forsterile (lower) + magnesium phosphate-based coating | PTFE | 90 | PES | 400 | 0.1 | 50 | ○○ | ○ | ○ |
| comparative example 4 | grain-oriented | 3.0 | forsterile (lower) + magnesium phosphate-based coating | PTFE | 100 | no | 400 | 0.1 | 50 | ○○ | X | Δ |
| comparative example 5 | grain-oriented | 3.3 | forsterile (lower) + magnesium phosphate-based coating | no | no | no | no | 0.5 | 5 | Δ | — | X |
| comparative example 6 | grain-oriented | 3.3 | forsterile (lower) + magnesium phosphate-based coating | no | no | PES | 400 | 0.4 | 7 | Δ | ○○ | ○○ |
| comparative example 7 | grain-oriented | 3.3 | forsterile (lower) + magnesium phosphate-based coating | PTFE | 10 | PES | 400 | 0.4 | 10 | Δ | ○○ | ○○ |
| practical example 9 | grain-oriented | 3.3 | forsterile (lower) + magnesium phosphate-based coating | PTFE | 20 | PES | 400 | 0.3 | 20 | ○ | ○○ | ○○ |

TABLE 1-1-continued

| | steel sheet | Si content % | under coating | fluorocarbon resin in top layer | fluorocarbon resin content % | the rest of top layer | baking temperature (PMT) ° C. | kinetic friction coefficient | punchability 10,000 times | sliding performance | adhesiveness | corrosion resistance |
|---|---|---|---|---|---|---|---|---|---|---|---|---|
| practical example 10 | grain-oriented | 3.3 | forsterile (lower) + magnesium phosphate-based coating | PTFE | 30 | PES | 400 | 0.2 | 40 | ○○ | ○○ | ○○ |
| practical example 11 | grain-oriented | 3.3 | forsterile (lower) + magnesium phosphate-based coating | PTFE | 40 | PES | 400 | 0.1 | 45 | ○○ | ○○ | ○○ |
| practical example 12 | grain-oriented | 3.3 | forsterile (lower) + magnesium phosphate-based coating | PTFE | 50 | PES | 400 | 0.1 | 50 | ○○ | ○○ | ○○ |
| practical example 13 | grain-oriented | 3.3 | forsterile (lower) + magnesium phosphate-based coating | PTFE | 60 | PES | 400 | 0.1 | 50 | ○○ | ○○ | ○○ |
| practical example 14 | grain-oriented | 3.3 | forsterile (lower) + magnesium phosphate-based coating | PTFE | 70 | PES | 400 | 0.1 | 50 | ○○ | ○○ | ○○ |
| practical example 15 | grain-oriented | 3.3 | forsterile (lower) + magnesium phosphate-based coating | PTFE | 80 | PES | 400 | 0.1 | 50 | ○○ | ○ | ○ |
| practical example 16 | grain-oriented | 3.3 | forsterile (lower) + magnesium phosphate-based coating | PTFE | 90 | PES | 400 | 0.1 | 50 | ○○ | ○ | ○ |
| comparative example 8 | grain-oriented | 3.3 | forsterile (lower) + magnesium phosphate-based coating | PTFE | 100 | no | 400 | 0.1 | 50 | ○○ | X | Δ |

*PMT: Peak Metal Temperature

TABLE 1-2

| | steel sheet | Si content % | under coating | fluorocarbon resin in top layer | fluorocarbon resin content % | the rest of top layer | baking temperature (PMT) ° C. | kinetic friction coefficient | punchability 10,000 times | sliding performance | adhesiveness | corrosion resistance |
|---|---|---|---|---|---|---|---|---|---|---|---|---|
| practical example 17 | grain-oriented | 3.0 | Forsterile (lower) + aluminum phosphate-based coating | PFA | 60 | PES | 400 | 0.2 | 50 | ○○ | ○○ | ○○ |
| practical example 18 | grain-oriented | 3.0 | Forsterile (lower) + aluminum phosphate-based coating | FEP | 60 | PES | 400 | 0.3 | 50 | ○ | ○○ | ○○ |
| practical example 19 | grain-oriented | 3.0 | Forsterile (lower) + aluminum phosphate-based coating | PTFE | 60 | PEEK | 400 | 0.1 | 50 | ○○ | ○○ | ○○ |
| practical example 20 | grain-oriented | 3.0 | Forsterile (lower) + aluminum phosphate-based coating | PTFE | 60 | PPS | 400 | 0.1 | 50 | ○○ | ○○ | ○○ |
| practical example 21 | grain-oriented | 3.0 | Forsterile (lower) + aluminum phosphate-based coating | PTFE | 60 | PES | 260 | 0.3 | 30 | ○ | ○ | ○ |
| practical example 22 | grain-oriented | 3.0 | Forsterile (lower) + aluminum phosphate-based coating | PTFE | 60 | epoxy | 260 | 0.3 | 30 | ○ | ○ | ○ |
| practical example 23 | grain-oriented | 3.0 | Forsterile (lower) + aluminum phosphate-based coating | PTFE | 60 | acrylic | 260 | 0.3 | 30 | ○ | ○ | ○ |
| practical example 24 | grain-oriented | 3.0 | Forsterile (lower) + aluminum phosphate-based coating | PTFE | 60 | mag-nesium phosphate | 400 | 0.1 | 40 | ○○ | ○ | ○ |
| practical example 25 | grain-oriented | 3.0 | Forsterile (lower) + aluminum phosphate-based coating | PTFE | 60 | aluminum phosphate | 400 | 0.1 | 40 | ○○ | ○ | ○ |
| comparative example 9 | grain-oriented | 3.0 | Forsterile (grain) + aluminum phosphate-based coating | PTFE | 30 | mag-nesium phosphate | 300 | 0.4 | 10 | Δ | x | Δ |
| comparative example 10 | grain-oriented | 3.0 | Forsterile (lower) + aluminum phosphate-based coating | PTFE | 30 | alum-inum di-chromate | 300 | 0.4 | 10 | Δ | x | Δ |
| comparative example 11 | grain-oriented | 3.0 | Forsterile (lower) + aluminum phosphate-based coating | PTFE | 60 | mag-nesium di-chromate | 300 | 0.4 | 20 | Δ | x | X |
| comparative example 12 | grain-oriented | 3.0 | Forsterile (lower) + aluminum phosphate-based coating | PTFE | 60 | alum-inum di-chromate | 300 | 0.4 | 20 | Δ | X | X |
| comparative example 13 | grain-oriented | 3.0 | Forsterile (lower) + aluminum phosphate-based coating | no | no | epoxy | 260 | 0.4 | 10 | Δ | ○○ | ○○ |

TABLE 1-2-continued

| | steel sheet | Si content % | under coating | fluorocarbon resin in top layer | fluorocarbon resin content % | the rest of top layer | baking temperature (PMT) ° C. | kinetic friction coefficient | punchability 10,000 times | sliding performance | adhesiveness | corrosion resistance |
|---|---|---|---|---|---|---|---|---|---|---|---|---|
| comparative example 14 | grain-oriented | 3.0 | Forsterile (lower) + aluminum phosphate-based coating | no | no | acrylic | 260 | 0.4 | 10 | Δ | ○○ | ○○ |
| comparative example 15 | grain-oriented | 3.0 | no | no | no | no | no | 0.6 | 5 | x | — | X |
| comparative example 16 | grain-oriented | 3.0 | no | no | no | PES | 400 | 0.4 | 7 | Δ | ○○ | ○○ |
| comparative example 17 | grain-oriented | 3.0 | no | PTFE | 10 | PES | 400 | 0.4 | 10 | Δ | ○○ | ○○ |
| practical example 26 | grain-oriented | 3.0 | no | PTFE | 20 | PES | 400 | 0.3 | 20 | ○ | ○○ | ○○ |
| practical example 27 | grain-oriented | 3.0 | no | PTFE | 30 | PES | 400 | 0.2 | 50 | ○○ | ○○ | ○○ |
| practical example 28 | grain-oriented | 3.0 | no | PTFE | 40 | PES | 400 | 0.1 | 60 | ○○ | ○○ | ○○ |
| practical example 29 | grain-oriented | 3.0 | no | PTFE | 50 | PES | 400 | 0.1 | 70 | ○○ | ○○ | ○○ |
| practical example 30 | grain-oriented | 3.0 | no | PTFE | 60 | PES | 400 | 0.1 | 70 | ○○ | ○○ | ○○ |
| practical example 31 | grain-oriented | 3.0 | no | PTFE | 70 | PES | 400 | 0.1 | 70 | ○○ | ○○ | ○○ |
| practical example 32 | grain-oriented | 3.0 | no | PTFE | 80 | PES | 400 | 0.1 | 70 | ○○ | ○ | ○ |
| practical example 33 | grain-oriented | 3.0 | no | PTFE | 90 | PES | 400 | 0.1 | 70 | ○○ | ○ | ○ |
| comparative example 18 | grain-oriented | 3.0 | no | PTFE | 100 | no | 400 | 0.1 | 70 | ○○ | X | Δ |

*PMT: Peak Material Temperature

TABLE 1-3

| | steel sheet | Si content % | under coating | fluorocarbon resin in top layer | fluorocarbon resin content % | the rest of top layer | baking temperature (PMT) ° C. | kinetic friction coefficient | punchability 10,000 times | sliding performance | adhesiveness | Corrosion resistance |
|---|---|---|---|---|---|---|---|---|---|---|---|---|
| comparative example 19 | grain-oriented | 3.3 | no | no | no | no | no | 0.6 | 5 | x | — | X |
| comparative example 20 | grain-oriented | 3.3 | no | no | no | PES | 400 | 0.4 | 7 | Δ | ○○ | ○○ |
| comparative example 21 | gain-oriented | 3.3 | no | PTFE | 10 | PES | 400 | 0.4 | 10 | Δ | ○○ | ○○ |
| practical example 34 | grain-oriented | 3.3 | no | PTFE | 20 | PES | 400 | 0.3 | 20 | ○ | ○○ | ○○ |
| practical example 35 | grain-oriented | 3.3 | no | PTFE | 30 | PES | 400 | 0.2 | 50 | ○○ | ○○ | ○○ |
| practical example 36 | grain-oriented | 3.3 | no | PTFE | 40 | PES | 400 | 0.1 | 60 | ○○ | ○○ | ○○ |
| practical example 37 | grain-oriented | 3.3 | no | PTFE | 50 | PES | 400 | 0.1 | 70 | ○○ | ○○ | ○○ |
| practical example 38 | grain-oriented | 3.3 | no | PTFE | 60 | PES | 400 | 0.1 | 70 | ○○ | ○○ | ○○ |
| practical example 39 | grain-oriented | 3.3 | no | PTFE | 70 | PES | 400 | 0.1 | 70 | ○○ | ○○ | ○○ |
| practical example 40 | grain-oriented | 3.3 | no | PTFE | 80 | PES | 400 | 0.1 | 70 | ○○ | ○ | ○ |
| practical example 41 | grain-oriented | 3.3 | no | PTFE | 90 | PES | 400 | 0.1 | 70 | ○○ | ○ | ○ |
| comparative example 22 | grain-oriented | 3.3 | no | PTFE | 100 | no | 400 | 0.1 | 70 | ○○ | x | Δ |
| practical example 42 | grain-oriented | 3.0 | aluminum phosphate-based coating (1 μm) | PTFE | 60 | PES | 400 | 0.1 | 70 | ○○ | ○○ | ○○ |
| practical example 43 | grain-oriented | 3.0 | magnesium dichromate-based coating (0.3 μm) | PTFE | 60 | PES | 400 | 0.1 | 70 | ○○ | ○○ | ○○ |
| practical example 44 | grain-oriented | 3.3 | aluminum phosphate-based coating (1 μm) | PTFE | 60 | PES | 400 | 0.1 | 70 | ○○ | ○○ | ○○ |

TABLE 1-3-continued

| | steel sheet | Si content % | under coating | fluorocarbon resin in top layer | fluorocarbon resin content % | the rest of top layer | baking temperature (PMT) ° C. | kinetic friction coefficient | punchability 10,000 times | sliding performance | adhesiveness | Corrosion resistance |
|---|---|---|---|---|---|---|---|---|---|---|---|---|
| practical example 45 | grain-oriented | 3.3 | magnesium dichromate-based coating (0.3 μm) | PTFE | 60 | PES | 400 | 0.1 | 70 | ○○ | ○○ | ○○ |
| comparative example 23 | non-oriented | 3.0 | no | no | no | no | no | 0.6 | 10 | x | — | X |
| comparative example 24 | non-oriented | 3.0 | no | no | no | PES | 400 | 0.4 | 20 | Δ | ○○ | ○○ |
| comparative example 25 | non-oriented | 3.0 | no | PTFE | 10 | PES | 400 | 0.4 | 30 | Δ | ○○ | ○○ |
| practical example 46 | non-oriented | 3.0 | no | PTFE | 20 | PES | 400 | 0.3 | 60 | ○ | ○○ | ○○ |
| practical example 47 | non-oriented | 3.0 | no | PTFE | 30 | PES | 400 | 0.2 | 80 | ○○ | ○○ | ○○ |
| practical example 48 | non-oriented | 3.0 | no | PTFE | 40 | PES | 400 | 0.1 | 90 | ○○ | ○○ | ○○ |
| practical example 49 | non-oriented | 3.0 | no | PTFE | 60 | PES | 400 | 0.1 | 100 | ○○ | ○○ | ○○ |
| practical example 50 | non-oriented | 3.0 | no | PTFE | 80 | PES | 400 | 0.1 | 100 | ○○ | ○ | ○ |
| Practical example 51 | non-oriented | 3.0 | no | PTFE | 90 | PES | 400 | 0.1 | 100 | ○○ | ○ | ○ |
| comparative example 26 | non-oriented | 3.0 | no | PTFE | 100 | no | 400 | 0.1 | 100 | ○○ | x | Δ |

*PMT: Peak Metal Temperature

TABLE 1-4

| | steel sheet | Si content % | under coating | fluorocarbon resin in top layer | fluorocarbon resin content % | the rest of top layer | baking temperature (PMT)** ° C. | kinetic friction coefficient | punchability 10,000 times | siding performance | adhesiveness | corrosion resistance |
|---|---|---|---|---|---|---|---|---|---|---|---|---|
| comparative example 27 | non-oriented | 0.25 | no | no | no | PES | 400 | 0.4 | 300 | Δ | ○○ | ○○ |
| comparative example 28 | non-oriented | 0.25 | no | PTFE | 10 | PES | 400 | 0.4 | 330 | Δ | ○○ | ○○ |
| practical example 52 | non-oriented | 0.25 | no | PTFE | 20 | PES | 400 | 0.3 | 350 | ○ | ○○ | ○○ |
| practical example 53 | non-oriented | 0.25 | no | PTFE | 30 | PES | 400 | 0.2 | 400 | ○○ | ○○ | ○○ |
| practical example 54 | non-oriented | 0.25 | no | PTFE | 40 | PES | 450 | 0.1 | 450 | ○○ | ○○ | ○○ |
| practical example 55 | non-oriented | 0.25 | no | PTFE | 60 | PES | 400 | 0.1 | 500 | ○○ | ○○ | ○○ |
| practical example 56 | non-oriented | 0.25 | no | PTFE | 80 | PES | 400 | 0.1 | 500 | ○○ | ○ | ○ |
| practical example 57 | non-oriented | 0.25 | no | PTFE | 90 | PES | 400 | 0.1 | 500 | ○○ | ○ | ○ |
| comparative example 29 | non-oriented | 0.25 | no | PTFE | 100 | no | 400 | 0.1 | 500 | ○○ | x | Δ |
| practical example 58 | non-oriented | 3.0 | no | PTFE | 60 | PEEK | 400 | 0.1 | 100 | ○○ | ○○ | ○○ |
| practical example 59 | non-oriented | 3.0 | no | PTFE | 60 | PPS | 400 | 0.1 | 100 | ○○ | ○○ | ○○ |
| practical example 60 | non-oriented | 3.0 | no | PTFE | 60 | PES | 400 | 0.1 | 100 | ○○ | ○○ | ○○ |
| practical example 61 | non-oriented | 3.0 | no | PTFE | 60 | epoxy | 260 | 0.3 | 80 | ○ | ○ | ○ |
| practical example 62 | non-oriented | 3.0 | no | PTFE | 60 | acrylic | 260 | 0.3 | 80 | ○ | ○ | ○ |
| practical example 63 | non-oriented | 3.0 | no | PTFE | 60 | mag-nesium phosphate | 400 | 0.1 | 40 | ○○ | ○ | ○ |
| practical example 64 | non-oriented | 3.0 | no | PTFE | 60 | aluminum phosphate | 400 | 0.1 | 40 | ○○ | ○ | ○ |

TABLE 1-4-continued

| | steel sheet | Si content % | under coating | fluorocarbon resin in top layer | fluorocarbon resin content % | the rest of top layer | baking temperature (PMT)** ° C. | kinetic friction coefficient | punchability 10,000 times | siding performance | adhesiveness | corrosion resistance |
|---|---|---|---|---|---|---|---|---|---|---|---|---|
| practical example 65 | non-oriented | 3.0 | aluminum phosphate-based coating (1 μm) | PTFE | 60 | PES | 400 | 0.1 | 100 | ○○ | ○○ | ○○ |
| practical example 66 | non-oriented | 3.0 | magnesium dichromate-based coating (0.3 μm) | PTFE | 60 | PES | 400 | 0.1 | 100 | ○○ | ○○ | ○○ |
| comparative example 30 | non-oriented | 3.0 | no | PTFE | 30 | mag-nesium di-chromate | 400 | 0.4 | 30 | Δ | x | Δ |
| comparative example 31 | non-oriented | 3.0 | no | PTFE | 30 | aluminum dichro-mate | 400 | 0.4 | 30 | Δ | x | Δ |
| comparative example 32 | non-oriented | 3.0 | no | PTFE | 60 | mag-nesium di-chromate | 400 | 0.4 | 50 | Δ | x | Δ |
| comparative example 33 | non-oriented | 3.0 | no | PTFE | 60 | aluminum dichro-mate | 400 | 0.4 | 50 | Δ | x | Δ |
| comparative example 34 | non-oriented | 3.0 | no | no | no | epoxy | 260 | 0.4 | 30 | Δ | ○○ | ○○ |
| comparative example 35 | non-oriented | 3.0 | no | no | no | acrylic | 260 | 0.4 | 30 | Δ | ○○ | ○○ |
| comparative example 36 | non-oriented dull | 3.0 | no | no | no | mag-nesium phosphate | no | 0.4 | 10 | ○○ | ○ | Δ |
| practical example 67 | grain-oriented | 3.0 | forsterile | PTFE | 40 | PES | 400 | 0.1 | 45 | ○○ | ○○ | ○○ |
| practical example 68 | grain-oriented | 3.0 | forsterile | PTFE | 60 | PES | 400 | 0.1 | 50 | ○○ | ○○ | ○○ |
| practical example 69 | grain-oriented | 3.0 | forsterile | PTFE | 80 | PES | 400 | 0.1 | 50 | ○○ | ○○ | ○○ |

*non-oriented dull: Ra = 1.5 μm
**PMT: Peak Metal Temperature

INDUSTRIAL APPLICABILITY

A magnetic steel sheet with a insulating coating having a high punching quality and sliding performance as well as an excellent adhesiveness can be achieved in either of magnetic steel sheets having a high hardness or magnetic steel sheets having a low hardness.

The invention claimed is:

1. A magnetic steel sheet comprising Si and an insulating coating having a chromium-free coating as its top layer coating, the top layer coating having a surface and containing 20 parts by mass or more and 90 parts by mass or less of a fluorocarbon resin for 100 parts by mass of the top layer coating and further comprising one or both of an organic resin and inorganic compounds, wherein the fluorocarbon resin is concentrated on an exposed surface of the top layer coating.

2. The magnetic steel sheet according to claim 1, wherein the fluorocarbon resin is at least one selected from the group consisting of a polytetrafluoroethylene (PTFE), a tetrafluoroethylene-perfluoroalkylvinylether copolymer (PFA), and a tetrafluoroethylene-hexafluoropropylene copolymer (FEP).

3. The magnetic steel sheet according to claim 1 wherein the top layer coating at least comprises the organic resin.

4. The magnet steel sheet according to claim 3, wherein the organic resin is one or two or more selected from an epoxy resin, an acrylic resin, a vinylacetate resin, a phenolic resin, a polyethersulfone resin (PES), a polyphenylenesulfide resin (PPS), a polysulfone resin, a polyallylsulfone resin, a polyether-etherketone resin (PEEK), a polyetherimide resin, and a polyamideimide resin.

5. The magnetic steel sheet according to claim 3, wherein the fluorocarbon resin is polytetrafluoroethylene (PTFE) and the organic resin is one or two selected from a polyethersulfone resin (PES) and a polyphenylenesulfide resin (PPS).

6. The magnetic steel sheet according to claim 3, wherein the fluorocarbon resin is concentrated during baking of an applied coating solution containing the fluorocarbon resin and the organic resin is added.

7. The magnetic steel sheet according to claim 3, wherein the top layer coating comprises a matrix of the organic resin, and further comprises the fluorocarbon resin dispersed in the matrix.

8. The magnetic steel sheet according to claim 1, comprising at least one of the inorganic compounds, wherein the inorganic compounds are one or two or more selected from phosphates, inorganic oxides of elements of group 3 in the periodic table, and metal compounds of the elements of the group 3 in the periodic table.

9. The magnetic steel sheet according to claim 1 wherein other components than the fluorocarbon resin in the top layer coating consist essentially of one or two of organic resin and inorganic compounds.

10. The magnet steel sheet according to claim 1 comprising 0.05–4.0% by mass Si.

11. The magnetic steel sheet according to claim 1 wherein the fluorocarbon resin is concentrated on the surface so that the kinetic friction coefficient of a surface of the insulating coating is 0.3 or less.

12. The magnetic steel sheet according to claim 11, wherein the kinetic friction coefficient of a surface of the insulating coating is 0.2 or less.

13. The magnetic steel sheet according to claim 3, wherein the top layer coating comprises at least one of the inorganic compounds, and wherein the inorganic compounds are one or more selected from phosphates and inorganic oxides of elements of group 3 in the periodic table.

14. The magnetic steel sheet according to claim 13, wherein the inorganic compounds comprises alumina.

15. The magnetic steel sheet according to claim 1, wherein the top layer coating comprises a matrix of the organic resin and/or the inorganic compounds, and further comprises the fluorocarbon resin dispersed in the matrix.

16. The magnetic steel sheet according to claim 1, wherein the top layer coating has a thickness of 0.01 to 5.0 μm.

17. A grain-oriented magnetic steel sheet comprising:

2 to 4% by mass of Si;

0.4% by mass or less of Mn;

0.1% by mass or less of Al;

0.5% by mass or less of 1 or 2 or more inhibitor elements;

the remainder being Fe and impurities; and wherein said grain-oriented magnetic steel sheet further comprises an insulating coating having a chromium-free coating as its top layer coating, said top layer coating containing 20 parts by mass or more and 90 parts by mass or less of a fluorocarbon resin for 100 parts by mass of the top layer coating, and wherein the fluorocarbon resin is concentrated on an exposed surface of the top layer coating.

18. A non-orientated magnetic steel sheet comprising:

4% by mass or less of Si;

1.0% by mass or less of Mn;

3.0% by mass or less of Al;

0.01% by mass or less of C;

0.5% by mass or less of P;

0.1% by mass or less of S;

0.1% by mass or less of Ti;

0.5% by mass or less of 1 or 2 or more of Zr, V, Nb, Ca, Sb, Sn, and Cu;

the remainder being Fe and impurities; and wherein said non-oriented magnetic steel sheet having an insulating coating further comprises a chromium-free coating as its top layer coating, the top layer coating containing 20 parts by mass or more and 90 parts by mass or less of a fluorocarbon resin of 100 parts by mass of the top layer coating, and wherein the fluorocarbon resin is concentrated on an exposed surface of the top layer coating.

19. A magnetic steel core comprising a plurality of magnetic steel sheets comprising Si and an insulating coating having a chromium-free coating as its top layer coating, the top layer coating containing 20 parts by mass or more and 90 parts by mass or less of a fluorocarbon resin for 100 parts by mass of the top layer coating, and wherein the fluorocarbon resin is concentrated on an exposed surface of the top layer coating.

20. The magnetic steel core according to claim 19, wherein the steel sheets comprise:

2 to 4% by mass of Si;

0.4% by mass or less of Mn;

0.1% by mass or less of Al;

0.5% by mass or less of 1 or 2 or more inhibitor elements; and the remainder being Fe and impurities.

21. The magnetic steel core according to claim 19, wherein the steel sheets comprise:

4% by mass or less of Si;

1.0% by mass or less of Mn;

3.0% by mass or less of Al;

0.01% by mass or less of C;

0.5% by mass or less of P;

0.1% by mass or less of S;

0.1% by mass or less of Ti;

0.5% by mass or less of 1 or 2 or more of Zr, V, Nb, Ca, Sb, Sn, and Cu; and the remainder being Fe and impurities.

22. A magnetic steel sheet comprising Si and an insulating coating having an under layer coating and a chromium-free coating as its top layer coating, the top layer coating containing 20 parts by mass or more and 90 parts by mass or less of a fluorocarbon resin for 100 parts by mass of the top layer coating, and wherein the fluorocarbon resin is concentrated on an exposed surface of the top layer coating.

* * * * *